(12) United States Patent
Wang et al.

(10) Patent No.: US 7,353,661 B2
(45) Date of Patent: Apr. 8, 2008

(54) VEHICLE EXHAUST HEAT RECOVERY SYSTEM

(75) Inventors: Xiaoliang Wang, Kariya (JP); Takahiro Moroi, Kariya (JP); Masanori Sonobe, Kariya (JP); Masahiro Kawaguchi, Kariya (JP)

(73) Assignee: Kabushiki Kaisha Toyota Jidoshokki, Kariya-shi (JP)

(*) Notice: Subject to any disclaimer, the term of this patent is extended or adjusted under 35 U.S.C. 154(b) by 294 days.

(21) Appl. No.: 11/064,553

(22) Filed: Feb. 24, 2005

(65) Prior Publication Data

US 2005/0188711 A1 Sep. 1, 2005

(30) Foreign Application Priority Data

Feb. 27, 2004 (JP) ............................. 2004-053930

(51) Int. Cl.
*F25B 1/00* (2006.01)
(52) U.S. Cl. .......................................... 62/226; 62/501
(58) Field of Classification Search ................. 62/501, 62/238.4, 324.1, 226
See application file for complete search history.

(56) References Cited

U.S. PATENT DOCUMENTS

| | | | |
|---|---|---|---|
| 2,411,347 A | 11/1946 | Trumpler | 62/115 |
| 4,055,964 A * | 11/1977 | Swenson et al. | 62/238.4 |
| 5,136,854 A * | 8/1992 | Abdelmalek | 62/116 |
| 5,544,484 A | 8/1996 | Voss et al. | 60/397 |
| 5,559,379 A | 9/1996 | Voss | 310/63 |
| 5,617,738 A | 4/1997 | Ikegami et al. | 62/509 |
| 5,761,921 A | 6/1998 | Hori et al. | 62/238.4 |
| 5,818,117 A | 10/1998 | Voss et al. | 290/40 A |

FOREIGN PATENT DOCUMENTS

| | | |
|---|---|---|
| EP | 1 441 121 A2 | 7/2004 |
| JP | 57-26365 | 2/1982 |
| JP | 2000-345915 | 12/2000 |
| WO | WO 00/71944 | 11/2000 |

* cited by examiner

*Primary Examiner*—Melvin Jones
(74) *Attorney, Agent, or Firm*—Morgan & Finnegan, L.L.P.

(57) ABSTRACT

A vehicle exhaust heat recovery system includes a vapor compression type refrigeration circuit, a boiler to which the refrigerant is introduced from the refrigeration circuit and heated, and an expander for generating motive power by expanding the heated refrigerant. The refrigerant circulates in the refrigeration circuit. The boiler heats the refrigerant introduced therein using exhaust heat generated by the vehicle. The refrigerant that has been subjected to expansion is recycled to the refrigeration circuit.

15 Claims, 2 Drawing Sheets

VEHICLE EXHAUST HEAT RECOVERY SYSTEM

BACKGROUND OF THE INVENTION

The present invention relates to a heat recovery system, in particular, a vehicle heat recovery system which generates motive energy by recovering exhaust heat from a combustion engine, which is a drive source of the vehicle.

A known vehicle exhaust heat recovery system generates motive power by driving a turbine using coolant water (high temperature vapor) that has been heated by the heat generated by an internal combustion engine. The motive force drives a generator that is operatively connected to the turbine for generating electric power (see for example Japanese Laid-Open Patent Publication 2000-345915).

However, the known structure for driving the turbine by means of the coolant water of the internal combustion engine has low energy conversion efficiency from thermal energy (exhaust heat from the engine) to mechanical energy (motive power generated by the turbine) since the expansion ratio of the coolant water is high. In order to improve the conversion efficiency, it is necessary, for example, to broaden piping or conduits comprising the coolant water circulation circuit or to increase the size of the turbine in its radial direction. This causes a problem of a vehicle exhaust heat recovery system that is large in size and which is difficult to be installed into the vehicle.

BRIEF SUMMARY OF THE INVENTION

An object of the invention is to provide a vehicle exhaust heat recovery system that has a small size and excellent energy conversion efficiency.

In order to achieve the above objectives, the present invention provides a vehicle exhaust heat recovery system comprising a vapor compression type refrigeration circuit, a boiler to which the refrigerant is introduced from the refrigeration circuit and an expander for generating motive power by expanding heated refrigerant. The refrigerant circulates in a refrigeration circuit. The boiler heats the refrigerant introduced therein by using exhaust heat generated by the vehicle. The refrigerant which is subjected to the expansion is recycled to the refrigeration circuit.

Since refrigerant used in a vapor compression type refrigeration circuit has a small expansion ratio, it is possible to obtain high conversion efficiency from thermal energy (vehicle exhaust heat) to mechanical energy (motive power generated by an expander) even when a small sized expander is used. Note that examples of the refrigerant used for the vehicle refrigeration circuit include, for example, Freon and carbon hydrides. The term "vehicle exhaust heat" as used herein includes exhaust heat from a transmission and exhaust heat from a braking system, since the vehicle exhaust heat is not limited to the exhaust heat from the engine E.

The refrigerant circulated back from the expander to the refrigeration circuit is cooled at a heat exchanger provided in the refrigeration circuit. Thus, according to the present invention, a dedicated heat exchanger for releasing the vehicle exhaust heat to the atmosphere as is provided in a conventional vehicle can be made smaller in size or can be omitted since the vehicle exhaust heat can be removed by means of the exhaust heat recovery system.

In one embodiment, the generator is operatively connected to the above described expander. The generator is driven by the motive power generated at the expander to generate electric power. Accordingly, the electric power that is supplied by the drive source in the conventional vehicle can be compensated by the electric power generated by the expander to reduce the load for generating electricity at the drive source.

In a further embodiment, the generator is also operatively connected to the vehicle drive source. Accordingly, in the case where the amount of the vehicle exhaust heat is small and the expander is unable to generate efficient motive power, the generator can be driven by the motive power supplied by the drive source to secure necessary electric power for the vehicle. In the case where the motive power generated by the expander exceeds in amount from that necessary for driving of the generator, a motive power in excess of that for the operation of the generator is generated by the expander. If the excess motive power is transmitted to the drive source, the driving of the vehicle can be facilitated so that the load of the drive source can further be reduced.

In a further embodiment of the invention, the refrigerant expanded at the expander is sent back to the refrigeration circuit by way of the inside of the generator. Accordingly, the inside of the generator is cooled by the refrigerant which has comparatively low temperature after expansion at the expander to improve electric power generation of the generator.

The refrigeration circuit comprises a compressor which compresses the refrigerant, a cooler which cools the refrigerant supplied from the compressor, a decompression device which decompresses the refrigerant that is cooled at the cooler and an evaporator which heats the refrigerant that is decompressed at the decompression device. The refrigerant that is heated at the evaporator is then carried to the compressor. The refrigerant flow channel, which extends from the cooler to the decompression device, is branched into a flow channel that is connected to a suction inlet of a pump. The pump takes the refrigerant from the refrigerant flow channel between the cooler and the decompression device and forces the refrigerant to a boiler. An expander is connected to the downstream of the boiler and the outlet of the expander is connected to the refrigerant flow channel between the compressor and the cooler within the refrigeration circuit.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

An embodiment of the vehicle exhaust heat recovery system of the present invention is described below.

Figure 1:
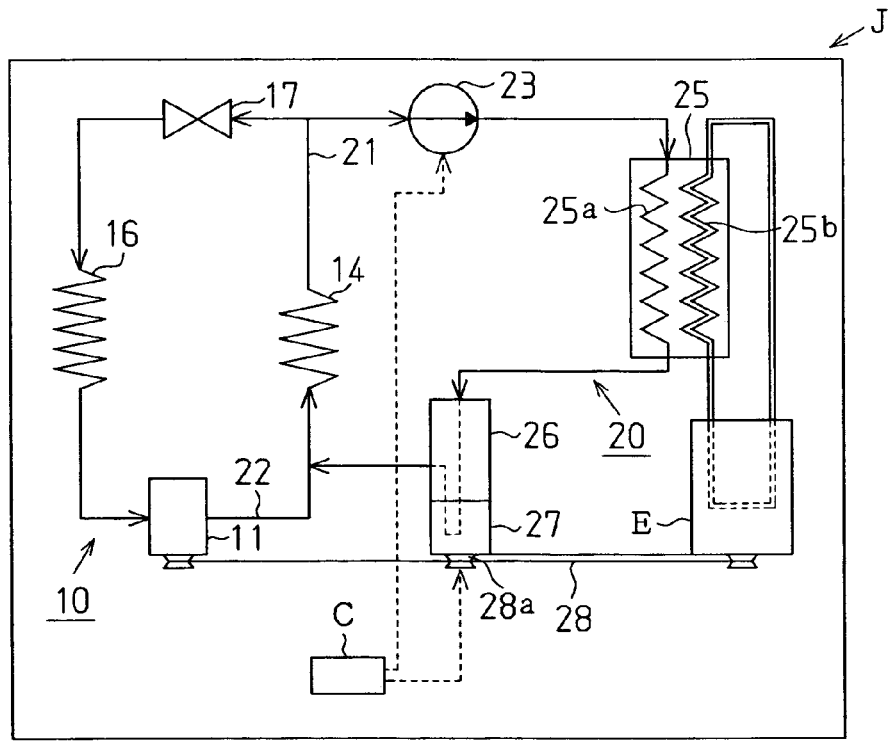
FIG. 1 schematically shows a vehicle exhaust heat recovery system according to an embodiment of the invention.

Referring to FIG. 1, an air conditioning system provided in a vehicle J includes a refrigeration circuit 10 of a vapor compression type. As the refrigerant of the refrigeration circuit 10, for example, Freon or carbon hydride can be used. The refrigeration circuit 10 comprises a cooler 14, an expansion valve 17 and an evaporator 16. The compressor 11 is driven by an internal combustion engine (hereinafter referred to as an "engine") E that is provided as a drive source for the vehicle J, and performs compression of the refrigerant gas. The refrigerant gas discharged from the compressor 11 and having high temperature and high pressure is cooled by the cooler 14. The refrigerant from the cooler 14 is decompressed by the expansion valve 17 which functions as a decompression device. The refrigerant from the expansion valve 17 is heated by the evaporator 16. The refrigerant, which went through heat exchange in the evaporator 16 with air that is directed to the cabin, is then taken into the compressor 11 and repeats the above described cycle.

An exhaust heat electricity generation circuit utilizing exhaust heat (circuit 20 for Rankine cycle) which uses a portion of the refrigeration circuit 10 is provided in the vehicle J. The refrigerant circuit 10 includes conduit or piping 21, which is a first refrigerant flow channel that connects the outlet of the cooler 14 and the inlet of the expansion valve 17. A refrigerant flow channel, which is branched from the piping 21, is connected to the suction inlet of the pump 23. The pump 23 comprises an electrically powered pump in which a dedicated electric motor (not shown in the figures) is installed. The discharge outlet of the pump 23 is connected to the inlet of the heat absorber 25a of a boiler 25. The pump 23 forces the refrigerant of the refrigeration circuit 10 to the heat absorber 25a. The refrigerant that is used for cooling the engine E to be heated to a high temperature is then sent to a radiator 25b of the boiler 25. Accordingly, the refrigerant that is sent to the heat absorber 25a from the refrigeration circuit 10 is heated through the heat exchange with the coolant water which has comparatively high temperature and which flows within the radiator 25b. In other words, the refrigerant in a liquid state that is introduced into the heat absorber 25a will be exhausted from the heat absorber 25a as a refrigerant gas having high temperature and high pressure.

The outlet of the heat absorber 25a is connected to the inlet of the expander 26 to which the refrigerant having a high pressure flows therein. A generator 27 is operatively connected to the expander 26. The refrigerant that is sent from the heat absorber 25a to the expander 26 is expanded within the expander 26. Accordingly, motive energy from expansion energy of the refrigerant is generated in the expander 26 and the motive energy drives the generator 27 to perform electricity generation. The motive power generated at the generator 27 is used for driving various electrical components (including the pump 23) that is provided in the vehicle J. The electricity thereby generated can either be temporarily stored in a battery not shown in the figures until it is used in the electric devices, or can be directly used without being stored in the battery.

The expander 26 and the generator 27 are connected to form a unit. The refrigerant that is decreased in pressure through expansion at the expander 26 is sent to the refrigeration circuit 10 by passing through the inside of the generator 27. More specifically, the refrigerant sent from the expander 26 reaches the outlet of the expander 26 by way of a space containing a rotator (not shown in the figures) that is disposed within the generator 27. A refrigerant flow channel extending from the outlet of the expander 26 is connected to conduits or piping 22, which is a second refrigerant flow channel connecting the discharge outlet of the compressor 11 and the inlet of the cooler 14. The refrigerant subjected to the expansion has high temperature and high pressure compared to the refrigerant that flows within the refrigeration circuit 10. The refrigerant from the expander 26 is sent to the cooler 14 through the piping 22 and is cooled in the cooler 14. The refrigerant cooled at the cooler 14 is then forced to the heat absorber 25a of the boiler by the pump 23 and repeats the circuit 20 for Rankine cycle.

The generator 27 is operatively connected to the engine E through a motive power transmission mechanism 28. The motive power transmission mechanism 28 includes an externally controllable clutch mechanism 28a such as an electromagnetic clutch. The clutch mechanism 28a and the above described pump 23 are controlled, for example, by an electronic controller such as a computer as described below.

If the temperature of the coolant water of the engine E (the temperature of the coolant water after being heated by the engine E) is below a first predetermined value, for example while the engine E is being warmed up, the pump 23 is stopped (turned OFF) as well as the clutch mechanism 28a being connected (turned ON).

By stopping the pump 23, flowing of the refrigerant into the circuit 20 is prevented. Accordingly, the coolant water that flows within the radiator 25b is not cooled through heat exchange at the boiler 25. Therefore the temperature of the coolant water of the engine E can be increased without being decreased by the operation of the circuit 20.

Because the clutch mechanism 28a is connected, the generator 27 receives the motive power from the engine E. The generator 27 is driven solely by the motive power from the engine E since the expander 26 does not function in a state in which the pump 23 is stopped.

If the temperature of the coolant water of the engine E is no less than the first predetermined value and below a second predetermined value that is greater than the first predetermined value, for example in winter season in which the coolant water is less likely to be increased, the refrigerant cannot be sufficiently heated at the heat absorber 25a. In this case, it is necessary to drive the generator 27 by both the motive power generated by the expander 26 and the motive power from the engine E because the expander 26 can not generate sufficient motive power. Accordingly, the pump 23 is turned ON to flow refrigerant into the circuit 20 as well as the clutch mechanism 28a being turned ON to transmit motive power from the expander 26 and the motive power from the engine E to the generator 27.

If the temperature of the coolant water of the engine E is no less than the second predetermined value and the heat absorber 25a can sufficiently heat the refrigerant, the pump 23 is turned ON while the clutch mechanism 28a is turned OFF. Accordingly, the generator 27 is driven solely by the motive power generated by the expander 26. In this case, the motive power generated by the expander 26, namely the adjustment of the amount of the electricity generation of the generator 27 is performed through adjustment of the amount of the refrigerant supplied to the boiler 25 by altering the rate of revolutions within the pump 23.

When the temperature of the coolant water of the engine E is no less than the second predetermined value and the engine E is at a high-load, for example when the vehicle J is in rapid acceleration (for example when the throttle opening is no less than a predetermined value), the pump 23 is turned ON to be operated with a high revolution speed and the clutch mechanism 28a is turned ON. Since the temperature of the coolant water is no less than the second predetermined value, the motive power generated by the expander 26 exceeds that necessary for driving the generator 27 so that excess motive power is generated in addition to the motive power used for driving the generator 27. Since the clutch mechanism 28*a* is turned ON, the excessive motive power is transmitted to the engine E through the motive power transmission mechanism 28 to facilitate driving of the vehicle J. In this way, rapid acceleration of the vehicle J can be obtained.

Note that the exhaust heat recovery of the above described engine E can be performed so long as the pump 23 is operated, regardless of the operation condition (operation or discontinuation of the compressor 11) of the refrigeration circuit 10.

In the embodiment described above, the refrigerant used for the vapor compression type refrigeration circuit 10 has a lower expansion ratio compared to water so that the conversion efficiency from thermal energy (exhaust heat from the vehicle J) to mechanical energy (motive power generated by the expander 26) is high even when a small expander 26 is used. Namely, the vehicle exhaust heat recovery system of the embodiment is small and has an excellent energy conversion rate.

The refrigerant recycled from the expander 26 to the refrigeration circuit 10 is cooled by the heat exchanger (cooler 14,) which is included in the refrigeration circuit 10. Accordingly, a radiator, the dedicated heat exchanger that is provided within the coolant water circulation circuit of the engine E, can be minimized or eliminated, to enable downsizing of the coolant water circuit.

The generator 27 is operatively connected to the expander 26 and the generator 27 performs electricity generation when it is driven by the motive force generated by the expander 26. Accordingly, the load from electric generation at the engine E can be reduced.

The generator 27 is also operatively connected to engine E. Therefore, when the engine E has a low exhaust heat amount for example, necessary electricity can be secured when the generator 27 is driven by the engine E. Further, the motive power generated by the expander 26 exceeds that necessary for driving the generator 27, the driving of the vehicle J is facilitated by the excessive motive power to further reduce the load of the engine E.

The refrigerant expanded by the expander 26 is recycled to the refrigeration circuit 10 by way of the inside of the generator 27. Accordingly, the inside of the generator 27 is cooled by the refrigerant that is subjected to expansion and has a relatively low temperature so that the electric generation efficiency of the generator 27 can be improved.

It should be apparent to those skilled in the art that the present invention may be embodied in many other specific forms without departing from the spirit or scope of the invention. Particularly, it should be understood that the invention may be embodied in the following forms.

Figure 2:
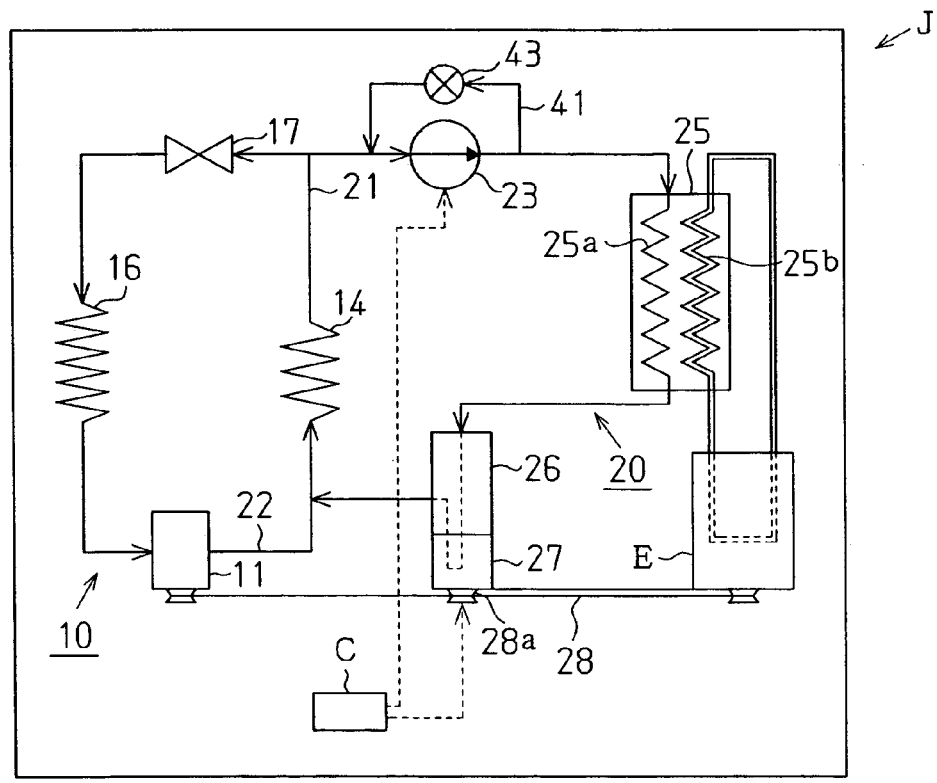
FIG. 2 schematically shows a vehicle exhaust heat recovery system according to another embodiment of the invention.

The drive source of the pump 23 can be the engine E or the expander 26. When the drive source of the pump 23 is the engine E, the revolution speed of the pump 23 (namely the discharge amount of the refrigerant per unit time) depends on the revolution speed of the engine E. Therefore, in this case, in order to provide adjustment of the refrigerant supply to the boiler 25, the pump 23 can be a variable discharge type in which the refrigerant supply (flow rate) is adjustable responsive to the revolution speed of the engine E (operation condition of the drive source) or the structure shown in FIG. 2 can be adopted. In other words, in the embodiment shown in FIG. 2, a bypass channel 41 that connects the discharge and suction sides of the pump 23 is provided internal or external of the pump 23. An electromagnetic valve 43 is disposed that is capable of adjusting the cross section area of the passage in response to the instructions from the external. The amount of refrigerant supplied from the pump 23 to the boiler 25 can be accordingly adjusted by the opening of the electromagnetic valve 43.

Figure 3:
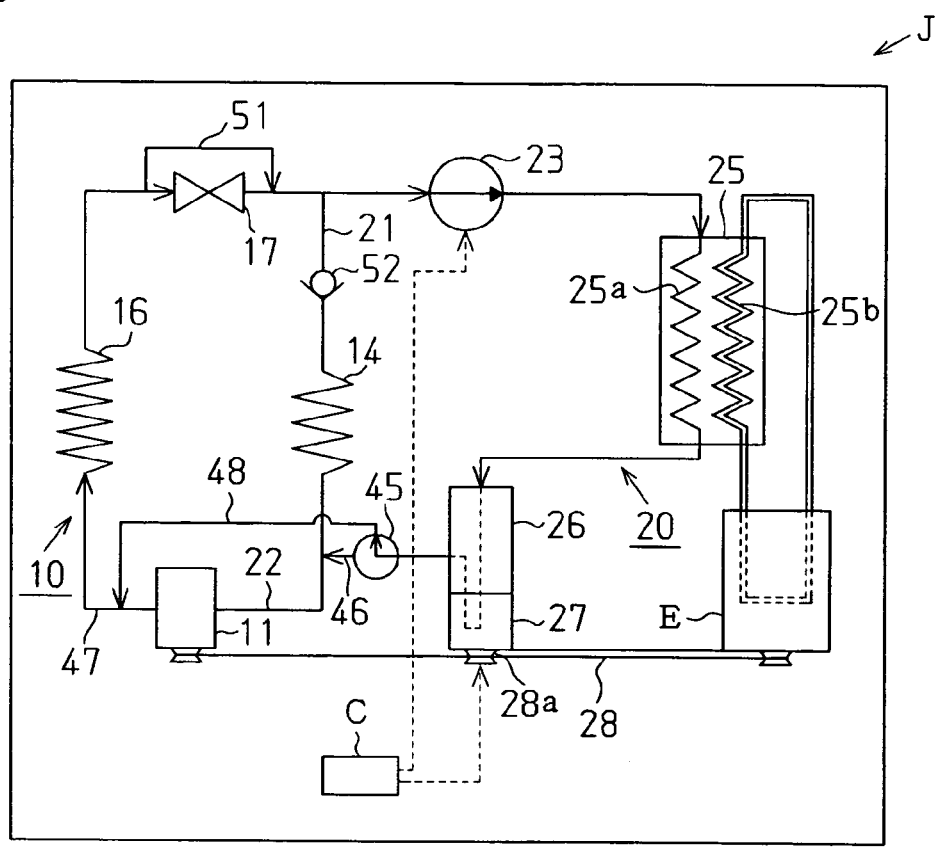
FIG. 3 schematically shows a vehicle exhaust heat recovery system according to a further embodiment of the invention.

As another embodiment, the refrigerant expanded at the expander 26 can be used for heating the cabin as shown in FIG. 3. Conduit or piping 47, which is a third refrigerant flow channel, connects the outlet of the evaporator 16 and the suction inlet of the compressor 11 in the refrigeration circuit 10. The outlet of the expander 26 is connected to a switching valve 45. Piping 46 that is connected to the piping 22, and piping 48 that is connected to the piping 47 are connected to the switching valve 45. The switching valve 45 alternatively connects the outlet of the expander 26 to the piping 46 or the piping 48. When heating of the cabin is performed, the compressor 11 is disconnected from the motive power transmission mechanism 28 through a clutch mechanism not shown in the figures, as well as the outlet of the expander 26 is connected to the piping 47 by the switching of the switching valve 45 to thereby supply high pressure refrigerant from the expander 26 to the evaporator 16.

In this case, the refrigerant which went through heat exchange at the evaporator 16 is flown in the reverse direction from the cooling operation of the refrigeration circuit shown in FIG. 1 toward the expansion valve 17. A bypass channel 51 is disposed to connect both ends of the expansion valve 17 so that the major part of the refrigerant from the evaporator 16 is moved to the pump 23 by way of the bypass channel 51. A check valve 52 is disposed in the piping 21 for preventing back-streaming of the refrigerant gas from the expansion valve 17 to the cooler 14 at a position in between a position where the first refrigerant flow channel extends toward the pump 23 and the cooler 14.

It is also possible to eliminate the clutch mechanism 28*a* from the motive power transmission mechanism 28 of the above described embodiment so that the generator 27 is always driven by the engine E when the engine E is in operation.

In the embodiment described above, it is possible to remove the operative connection between the generator 27 and the engine E through the motive power transmission mechanism 28 so that the drive source of the generator 27 is only the expander 26.

It is also possible to send exhaust gas from the engine E to the radiator 25*b* to heat the refrigerant of the heat absorber 25*a* by the heat of exhaust gas, which is exhaust heat from the vehicle J.

It is also possible to send lubrication oil (engine oil) that passed through the inside of the engine E to the radiator 25*b* so that the refrigerant of the heat absorber 25*a* can be heated by the heat of the lubricant oil, which is exhaust heat from the vehicle J.

It is possible to send the refrigerant from the pump 23 to a channel formed inside of the engine E (a channel corresponding to a so-called water jacket in a water-cooled engine) to heat the refrigerant in the channel. In other words, the refrigerant can be directly heated at the engine E without using a medium such as a coolant water or exhaust gas, etc. In this case, the engine E itself can function or be recognized as a boiler. By doing so, a coolant water circulation circuit can be eliminated from the engine E to simplify the structure of the vehicle.

The vehicle exhaust heat recovery system of the invention can be applied to an electric vehicle that has an electric motor as a drive source or a hybrid car. Coolant water used for cooling the electric motor or an inverter that drives the electric motor can be sent to the boiler 25 to thereby heat the refrigerant from the refrigeration circuit 10 at the boiler 25. Alternatively, the refrigerant can be sent to a channel formed inside of the electric motor and/or the inverter (a channel corresponding to a so-called water jacket in a water-cooled electric motor or inverter) to heat the refrigerant in the channel. In other words, the refrigerant can be directly heated by the electric motor and/or inverter without using a medium such as coolant water. In this case, the electric motor itself and/or the inverter itself can be recognized as the boiler. In doing so, the coolant water circulation circuit can be eliminated from the electric motor and/or the inverter so that the vehicle structure can be simplified.

For the refrigerant of the refrigeration circuit 10, isobutene or propane, for example, can be used.

Therefore, the present examples and embodiments are to be considered as illustrative and not restrictive and the invention is not to be limited to the details given herein, but may be modified within the scope and equivalence of the appended claims.

What is claimed is:

1. A system for use in a vehicle with a refrigerant for vehicle exhaust heat recovery, the system comprising:
    a vapor compression type refrigerant circuit in which refrigerant circulates;
    a boiler to which the refrigerant is introduced from the refrigeration circuit, wherein the boiler heats the refrigerant introduced by using exhaust heat generated by the vehicle; and
    an expander for generating motive power by expanding the heated refrigerant, wherein the refrigerant which is subjected to the expansion is recycled to the refrigeration circuit,
    wherein the expander is operatively connected to a generator, said generator is operated by the motive power generated by the expander to generate electricity,
    wherein the refrigerant expanded at the expander is recycled to the refrigeration circuit by way of the inside of the generator, and
    wherein the generator is operatively connected to a drive source for the vehicle.

2. The system according to claim 1, wherein the refrigeration circuit includes:
    a compressor for compressing the refrigerant;
    a cooler for cooling the refrigerant from the compressor;
    a decompression device which decompresses the refrigerant that is cooled at the cooler; and
    an evaporator which heats the refrigerant that is decompressed at the decompression device,
    the system further comprising:
    a pump connected to a first refrigerant flow channel that extends between the cooler and the decompression device,
    wherein the pump takes the refrigerant from the first refrigerant flow channel to force the refrigerant to the boiler and wherein the expander includes an outlet connected to a second refrigerant flow channel that extends between the compressor and the cooler.

3. The system according to claim 2, further comprising a switching valve that connects the outlet of the expander alternatively between the second refrigerant flow channel and a third refrigerant flow channel that extends between the compressor and the evaporator.

4. The system according to claim 1, wherein the boiler comprises a heat absorber through which the refrigerant passes and a radiator through which a heat medium from an exhaust heat source provided in the vehicle passes, wherein the heating of the refrigerant is performed through heat exchange between the refrigerant and the heat medium.

5. The system according to claim 4, wherein the exhaust heat source is a drive source of the vehicle.

6. The system according to claim 5, wherein the heat medium is coolant water, which cools the drive source.

7. The system according to claim 5, wherein the drive source is an internal combustion engine and the heat medium is exhaust gas exhausted from the internal combustion engine or lubricant oil that lubricates the internal combustion engine.

8. The system according to claim 5, further comprising:
    a pump which sends the refrigerant from the refrigeration circuit to the boiler;
    a generator operatively connected to the expander and the drive source; and
    a controller that controls the operation condition of the pump and the connection between the drive source and the generator responsive to the temperature of the heat medium.

9. The system according to claim 8, wherein the controller stops the pump and connects the drive source and the generator if the temperature of the heat medium is below a first predetermined value.

10. The system according to claim 9, wherein the pump is operated and the drive source and the generator are connected if the temperature of the heat medium is no less than the first predetermined value and below a second predetermined value that is greater than the first predetermined value.

11. The system according to claim 10, wherein the pump is operated and the generator is disconnected from the drive source if the temperature of the heat medium is no less than the second predetermined value.

12. The system according to claim 1, wherein the exhaust heat source provided in the vehicle functions as a boiler.

13. The system according to claim 12, wherein the exhaust heat source is a drive source of the vehicle.

14. The system according to claim 1, further comprising a pump, which sends the refrigerant from the refrigeration circuit to the boiler, wherein the pump is driven by a drive source of the vehicle.

15. The system according to claim 14, further comprising an adjustment device which adjusts the flow rate of the refrigerant from the pump to the boiler responsive to the operation condition of the drive source.

* * * * *